United States Patent
Koyasu

[11] Patent Number: 5,973,276
[45] Date of Patent: Oct. 26, 1999

[54] COMBINATION SWITCH

[75] Inventor: Ryo Koyasu, Shizuoka-ken, Japan

[73] Assignee: Yazaki Corporation, Tokyo, Japan

[21] Appl. No.: 09/044,791

[22] Filed: Mar. 20, 1998

[30] Foreign Application Priority Data

Mar. 26, 1997 [JP] Japan ..................................... 9-073988

[51] Int. Cl.⁶ ................................................. H01H 9/00
[52] U.S. Cl. .................................... 200/61.54; 200/61.54
[58] Field of Search .................................. 200/570, 571, 200/564, 336, 71.27, 4, 17 R, 61.27, 61.54, 335

[56] References Cited

U.S. PATENT DOCUMENTS 5,670,765  9/1997  Yokoyama et al. .................. 200/61.54
5,804,784  9/1998  Uchiyama et al. .................. 200/61.54

FOREIGN PATENT DOCUMENTS 7-335060  12/1995  Japan .

Primary Examiner—Michael L. Gellner
Assistant Examiner—Nhung Nguyen
Attorney, Agent, or Firm—Finnegan, Henderson, Farabow, Garrett & Dunner, L.L.P.

[57] ABSTRACT

A combination switch is provided with a movable knob and a contact assembly. The movable knob is rotatable with respect to a lever base and has a movable contact. The contact assembly includes a holder, a volume plate and a rivet. The holder has a bottom portion opposite to the movable contact, a cylinder portion projecting from the bottom portion and fixed to the lever base, and a terminal plate fixed within the bottom portion. The volume plate is disposed on the bottom portion of the holder, and has a fixed contact slidably in contact with the movable contact. The rivet fixes the volume plate on the bottom portion, and electrically connects the fixed contact with the terminal plate. As mentioned above, a reliability and an assembling characteristic are improved by assembling between the volume plate and the holder, and between the volume plate and the rivet.

6 Claims, 2 Drawing Sheets

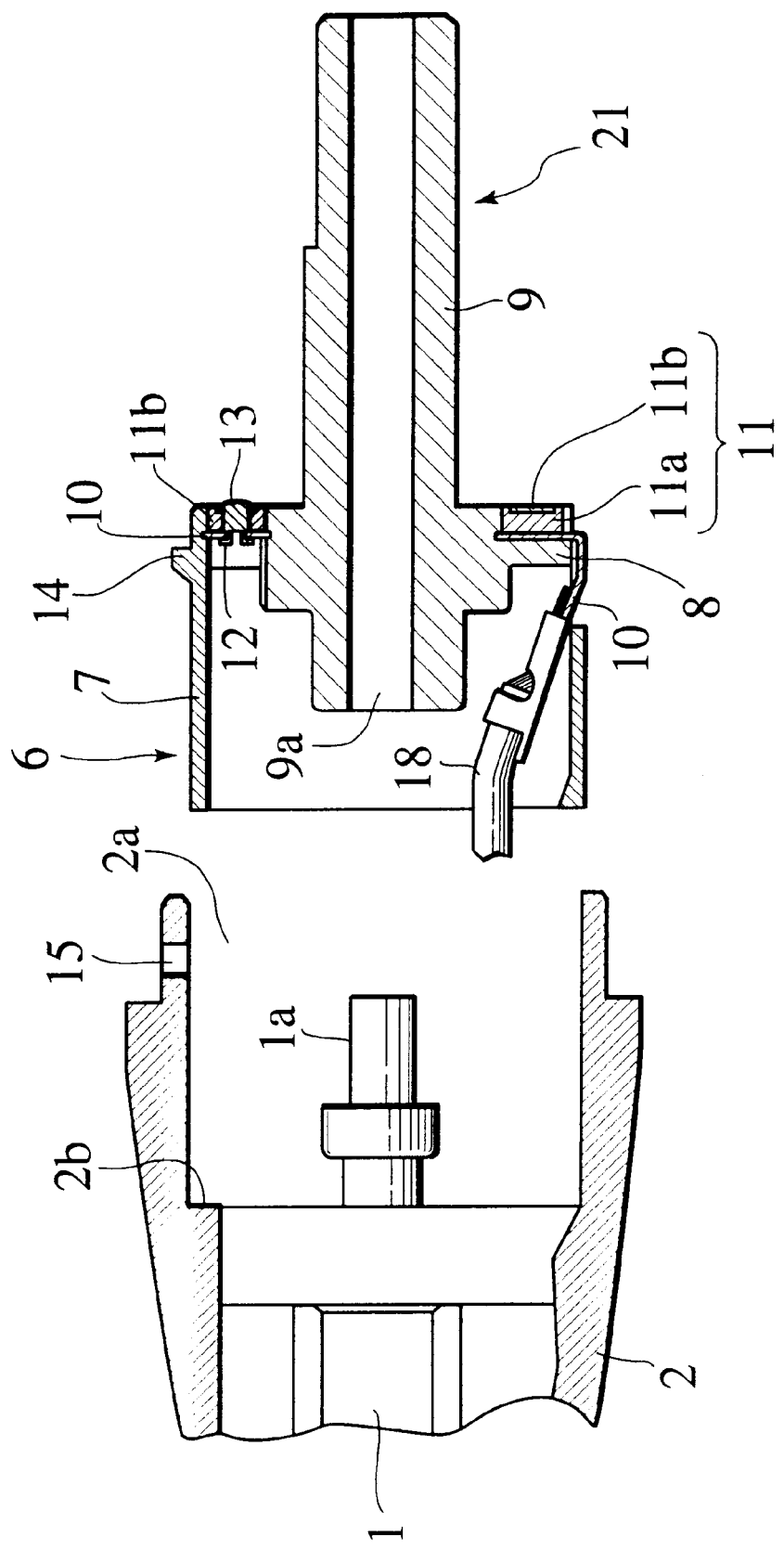

COMBINATION SWITCH

BACKGROUND OF THE INVENTION

The present invention relates to a combination switch having a fixed contact close to a lever base and a movable contact close to a movable knob.

Conventionally, a combination switch of this type is provided with a movable knob which is movable with respect to a cylindrical lever base and has a movable contact, and a ring-like volume plate having a fixed contact.

A fixing shaft is mounted to a steering column and the like of a vehicle, and extends through the lever base. The lever base is fixed to the fixing shaft. The movable knob is rotatably mounted to a front end portion of the fixing shaft projecting from the lever base, the movable contact is disposed in such a manner as to oppose to an end surface of the lever base.

The front end portion of the fixing shaft has a surface adjacent to the end surface of the lever base. The volume plate is mounted in such a manner as to stride over the end surface of the lever base and the adjacent surface of the fixing shaft. The fixed contact which is in contact with the movable contact in a sliding manner is disposed on the volume plate. The fixed contact is connected to a combination meter or the like of the vehicle through an electric wire.

SUMMARY OF THE INVENTION

The conventional combination switch is mounted in such a manner that the volume plate strides over the lever base and the fixing shaft, and is structured such as to directly connect the electric wire to the volume plate. Accordingly, the volume plate is unstably fixed and tends to move due to a slide of the movable contact, so that there is a lack of reliability in contact. Further, since the volume plate corresponding to a small part to which the electric wire is connected is mounted in a narrow portion between the lever base and the fixing shaft, an assembling operation is complex.

The present invention is made by taking the points mentioned above into consideration, and an object of the present invention is to improve reliability and assembling characteristic of a combination switch.

In order to achieve the object mentioned above, in accordance with the present invention, there is provided a combination switch comprising:

a movable knob rotatable with respect to a lever base and having a movable contact; and a contact assembly including a holder, a volume plate and a rivet, wherein the holder has a bottom portion opposite to the movable contact, a cylinder portion projecting from the bottom portion and fixed to the lever base, and a terminal plate fixed within the bottom portion, the volume plate is disposed on the bottom portion of the holder and has a fixed contact which is slidably in contact with the movable contact, and the rivet fixes the volume plate on the bottom portion and electrically connects the fixed contact with the terminal plate.

In the structure mentioned above, the rivet fixes the volume plate on the bottom portion of the volume plate and electrically connects the fixed contact with the terminal plate. Accordingly, an electrical contact state between the fixed contact and the terminal plate becomes stable. A mechanical mounting strength between the holder and the volume plate is increased. Since the contact assembly can be assembled in the lever base only by fixing the cylinder portion of the holder to the lever base, an operation is simple.

Accordingly, there is no possibility that the volume plate moves so as to cause a contact failure with the movable contact, so that a combination switch having a high reliability can be obtained, and an operation of assembling the contact assembly in the lever base can be simply performed.

It is possible to provide a shaft portion integrally projecting from substantially the center of the bottom portion in the cylinder portion in the holder and to rotatably support the movable knob by the shaft portion.

It is possible to fit and fix the cylinder portion to the lever base.

It is possible to provide a fitting portion to which the cylinder portion is fitted and a locking hole formed in the fitting portion in the lever base, and to provide a hook engaging with the locking hole in a state of being fitted to the fitting portion in the cylinder portion, and to fix the cylinder portion to the lever base by an engagement between the hook and the locking hole.

It is possible to lay the terminal plate under the holder by an insert molding in a state of being partially exposed, and to electrically connect the exposed portion of the terminal plate and the fixed contact with each other by the rivet.

It is possible to caulk the exposed portion of the terminal plate and the fixed contact by the rivet.

BRIEF DESCRIPTION OF THE DRAWINGS

FIG. 2 is a vertical cross sectional view which shows a separation state between a lever base and a contact assembly shown in FIG. 1.

DESCRIPTION OF THE PREFERRED EMBODIMENTS

Figure 1:
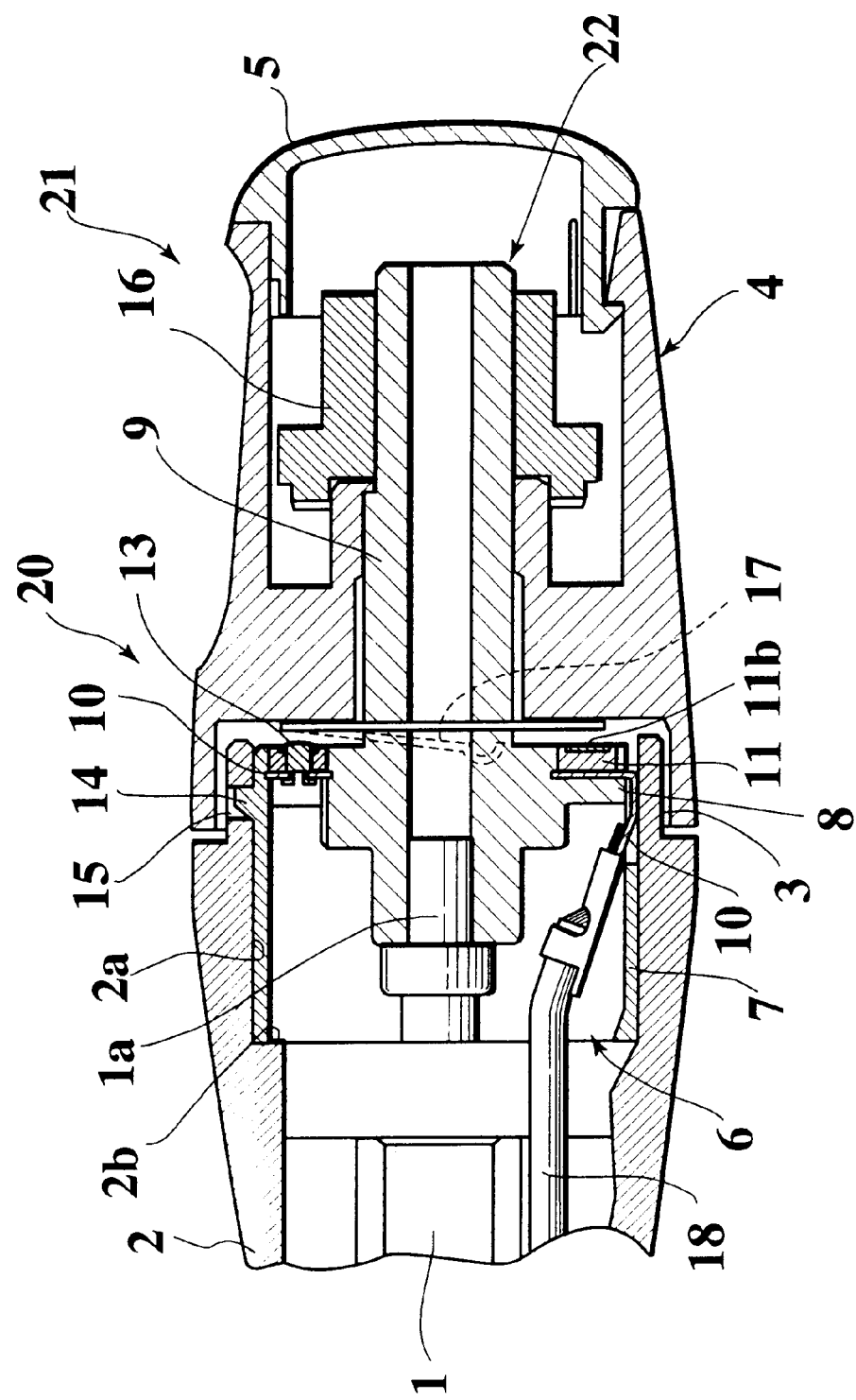
FIG. 1 is a vertical cross sectional view which shows a combination switch in accordance with an embodiment of the present invention.

An embodiment in accordance with the present invention will be described below with reference to the attached drawings.

In FIG. 1, an operation lever 20 is provided with a fixing shaft 1 mounted to a steering column (not shown) or the like of a vehicle, a cylindrical lever base 2 and a combination switch 21.

The combination switch 21 is provided with a movable knob 4 rotatable with respect to the lever base 2, and a contact assembly including a holder 6, a volume plate 11 and a rivet 13.

The fixed shaft 1 is mounted to the steering column of the vehicle and extends through the lever base 2. The lever base 2 is fixed to the fixing shaft 1.

An opening portion 2a corresponding to a fitting portion is formed in the front end of the lever base 2. A step portion 2b is formed on an inner periphery of the opening portion 2a, and a locking hole 15 is formed on the side wall of the opening portion 2a. A front end portion 1a of the fixing shaft 1 projects into the opening portion 2a. A contact assembly 22 is mounted to the opening portion 2a of the lever base 2.

As shown in FIG. 2, the contact assembly 22 is provided with a holder 6, a volume plate 11 mounted to the holder 6 and a rivet 13.

The holder 6 has a bottom portion 8, a cylinder portion 7 projecting to a side from a peripheral edge of the bottom portion 8, and a shaft portion 9 passing through a substantial center portion 8a of the bottom portion 8 and projecting to one side and the other side. The bottom portion 8, the cylinder portion 7 and the shaft portion 9 are integrally formed.

A ring-like terminal plate 10 is integrally laid under the bottom portion 8 by an insert molding. The terminal plate 10 is partially exposed to inner surface (a surface close to the one side) of the bottom plate 8.

The volume plate 11 is disposed on an outer surface (a surface close to the other side) of the bottom portion 8. The volume plate 11 has a ring-like base plate 11a, and a fixed contact 11b disposed on the surface of the base plate 11a and having a circular arc shape. The rivet 13 is fixed by caulking the fixed contact 11b and the exposed portion 12 of the terminal plate 10. Accordingly, the fixed contact 11b and the terminal plate 10 are electrically connected to each other, and the volume plate 11 and the holder 6 are mechanically connected and fixed to each other. An electrical wire 18 connected to a combination meter or the like of the vehicle is connected to the terminal plate 10.

The contact assembly 22 structured in a manner mentioned above is fixed to the lever base 2 by fitting to the opening portion 2a of the lever base 2, inserting a hole 9a of the shaft portion 9 to the front end portion 1a of the fixing shaft 1, and locking a hook 14 formed on the outer periphery of the cylinder portion 7 with a locking hole 15 of the lever base 2. A cross sectional shape of the hole 9a and the front end portion 1a is formed in a non-circular shape.

In FIG. 1, the movable knob 4 is rotatably fitted into the shaft portion 9 of the holder 6. The cap 5 is mounted to the front end of the shaft portion 9 in a state that a hooking member 16 for preventing a coming-out is mounted. The movable knob 4 is rotatably fitted to the step portion 3 in the front end of the lever base 2.

A movable contact 17 of a plate spring type is mounted to the front surface of the movable knob 4. The movable contact 17 slides on the fixed contact 11b due to rotation of the movable knob 4.

In the combination switch 21 in accordance with the embodiment, the terminal plate 10 laid under the holder 6 and the volume plate 11 are caulked by the rivet 13. Accordingly, an electrical connection state between the fixed contact 11b and the terminal plate 10 becomes stable. Further, a high mechanical mounting strength can be secured between the holder 6 and the volume plate 11.

Since the previously assembled contact assembly 22 is fitted into the lever base 2, an assembling operation of the contact assembly 22 can be simply performed by one touch. Further, since the movable knob 4 is inserted into the shaft portion 9 of the holder 6, the movable knob 4 can stably rotate around the shaft portion 9.

What is claimed is:

1. A combination switch comprising, a movable knob rotatable with respect to a lever base and having a movable contact; and a contact assembly including a holder, a volume plate and a rivet, wherein the holder has a bottom portion opposite to the movable contact, a cylinder portion projecting from the bottom portion and fixed to the lever base, and a terminal plate fixed within the bottom portion, the volume plate is disposed on the bottom portion of the holder and has a fixed contact which is slidably in contact with the movable contact, and the rivet fixes the volume plate on the bottom portion and electrically connects the fixed contact with the terminal plate.

2. A combination switch as recited in claim 1, wherein the holder has a shaft portion integrally projecting from a substantial center portion of the bottom portion of the cylinder portion, and the movable knob is rotatably supported to the shaft portion.

3. A combination switch as recited in claim 1, wherein the cylinder portion is fitted and fixed to the lever base.

4. A combination switch as recited in claim 3, wherein the lever base has a fitting portion to which the cylinder portion is fitted and a locking hole formed in the fitting portion, the cylinder portion has a hook engaging with the locking hole in a state of being fitted to the fitting portion, and the cylinder portion is fixed to the lever base by an engagement between the hook and the locking hole.

5. A combination switch as recited in claim 1, wherein the terminal plate is arranged to be partially exposed within the holder, and the exposed portion of the terminal plate and the fixed contact are electrically connected to each other by the rivet.

6. A combination switch as recited in claim 5, wherein the exposed portion of the terminal plate and the fixed contact are caulked by the rivet.

* * * * *